June 3, 1930. A. J. ADAMS Re. 17,686

SWIVELING CHAIR

Original Filed July 27, 1925

Inventor:
Arthur J. Adams,
By Arthur M. Shelson
Attorney.

Reissued June 3, 1930 Re. 17,686

UNITED STATES PATENT OFFICE

ARTHUR J. ADAMS, OF RENTON, WASHINGTON, ASSIGNOR TO WILLIAM S. FERRIS, OF ELKHART, INDIANA, TRADING AS DOMORE CHAIR COMPANY

SWIVELING CHAIR

Original No. 1,691,035, dated November 13, 1928, Serial No. 46,229, filed July 27, 1925. Application for reissue filed April 23, 1930. Serial No. 446,764.

This invention relates to improvements in swiveling chairs and consists of the matters hereinafter described and more particularly pointed out in the appended claims.

One of the objects of the invention is to provide a novel connection between the seat post and standard permitting a rotative movement of the post with respect to the standard and at the same time a relative vertical movement between the two.

A further object is to provide a construction including a tube in which the seat post is disposed for rotative but not endwise movement and to provide a means on the standard for securing said tube thereto, which means readily permits of a vertical adjustment between the tube and standard.

These objects of the invention as well as others, together with the advantages thereof, will more fully appear as I proceed with my specification.

Figure 1:
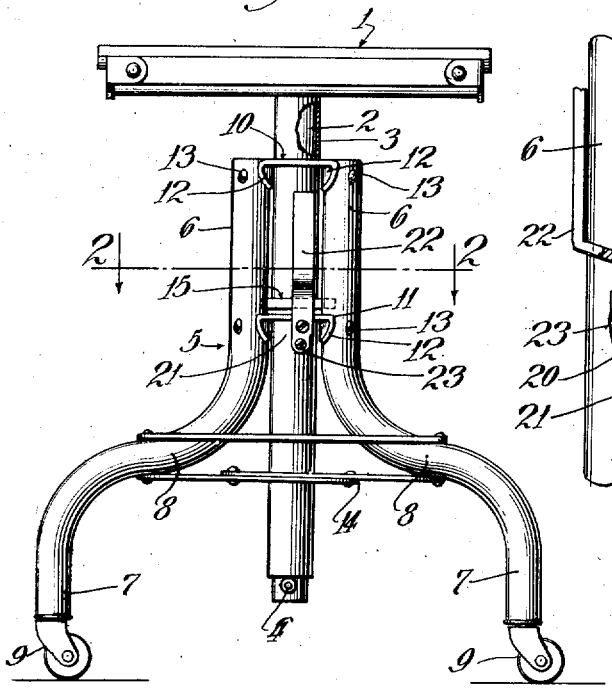
Fig. 1 is a view in front elevation of a chair embodying my improved invention.
Figure 3:
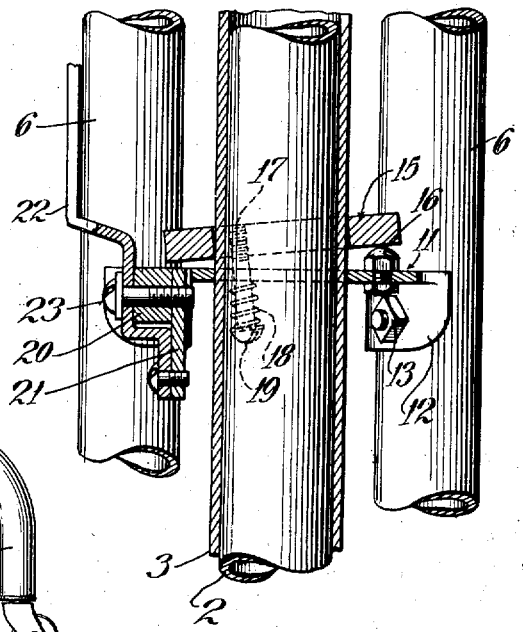
Fig. 3 is a vertical sectional view as taken on the line 3—3 of Fig. 2.
Figure 2:
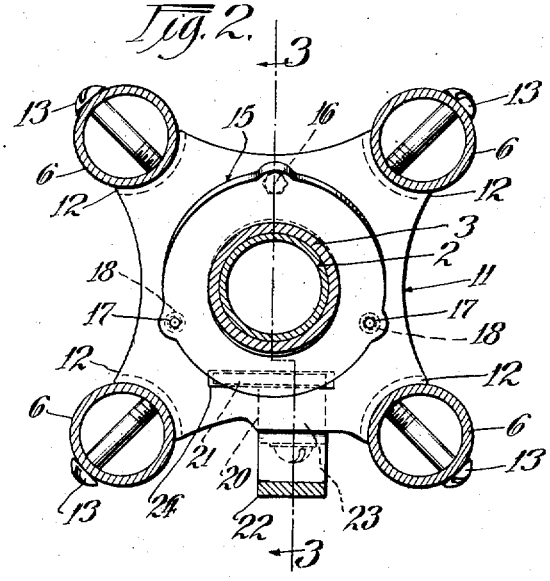
Fig. 2 is a horizontal sectional view on an enlarged scale as taken on the line 2—2 of Fig. 1.

Referring now in detail to that embodiment of the invention illustrated in the accompanying drawings, 1 indicates as a whole the seat frame and seat of a swiveling chair, and 2 indicates the post upon the top end of which the seat frame is secured in any suitable manner. As the construction of the seat frame itself and the manner of attaching it to the post 2 forms no particular part of the present invention, it need not be described in further detail at this time.

The post 2, which is of substantial length is in the form of a metallic tube having a smooth exterior surface and is journalled in a second tube 3. The seat post is capable of a free rotating movement in the tube 3 and is held therein against endwise movement in any suitable manner. As shown herein, a bolt 4 is threaded through the bottom end of the seat post and is engaged with the bottom end of the tube 3 to prevent such an endwise movement.

5 indicates as a whole the standard or base of the chair and with which the tube 3, together with the post 2, is vertically adjustable in a manner which will appear later. Said standard is made up of a plurality of tubular metallic legs, each of which has a vertical top portion or end 6 and a vertical bottom portion or end 7 which is offset with respect to the top portion and is connected thereto by intermediate horizontal and reverse curved portions 8. A caster 9 is provided on the bottom end of each leg.

The vertical top ends of said legs are grouped together about vertically spaced top and bottom spiders or plates 10 and 11, respectively, each of which includes arcuately spaced ears 12 with which said leg parts are engaged and are secured as by the bolts 13. Said spiders have centrally arranged aligned openings for the easy passage therethrough of the tube 3 which also has a smooth exterior. When the legs are secured to the spiders as before mentioned, the bottom ends of said legs are disposed radially with respect to the post 2 and tube 3 so that the standard presents a stable support or base for the chair as a whole. The horizontal portions of all of said legs are connected together by a suitable bracing spider 14.

Figure 4:
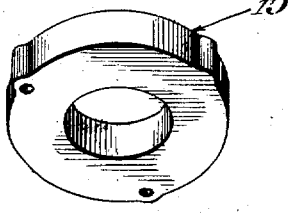
Fig. 4 is a perspective view of a binding or clamping ring embodied in my improved construction.

Surrounding the tube 3 just above the bottom spider 11 is a binding ring or annulus 15 (see Fig. 4) which has a central bore slightly larger than the outside diameter of said tube. The spider 11 has a short upstanding stud 16 on its top side in a position arranged between two adjacent ears 12—12. As shown said stud is formed by the head of a bolt secured in said spider by an associated nut. The underside of a portion of said ring engages on said stud and is capable of a limited rocking movement about the same as a fulcrum. Spaced at equal arcuate distances from said stud are bolts 17—17, each passing up through suitable holes in the bottom spider and threaded into said binding ring. A helical expansion spring 18 surrounds each bolt and abuts at its ends between the head 19 of the bolt and the underside of the spider 11. The springs normally act through the bolts to draw the associated side of the ring (which is diametrically opposite what may be termed the fulcrum side thereof) downwardly toward the plate and out of a plane at a right angle to the tube and post so that said ring binds on said post and is thus locked thereto.

Means are provided to act in opposition to said springs when manipulated to move the ring into a position standing at a right angle to said post and tube and thus release the clamping action of said ring so that the post and tube may be capable of a vertical adjustment upwardly or downwardly and such means is as follows:

On the bottom side of said bottom spider at a point substantially opposite the stud 16 is provided a lug 20. Upon the inner side of said lug is provided a cam member 21 and on the outer side of said lug is pivoted a lever 22, the common pivotal axis of said cam member and lever being provided by a screw 23. The shorter end of said lever is offset outwardly to pass the adjacent leg members of the standard and at the same time to provide the handle for actuating the cam. In said bottom spider is formed a slot 24, in the plane of the cam member so that when said lever is actuated the cam will pass through said slot and engage the ring to move the same against the action of the springs as before described. By the use of the bolts 17—17 the tension of the springs 18 may be adjusted to the best binding action of the ring upon the tube 3.

Assume that the ring is in a position exerting a binding action on the tube and it is desired to adjust the height of the seat frame to the comfort of the occupant. Under such conditions the lever 22 stands substantially vertical between two adjacent legs of the standard. Upon actuation, the cam member 21 will pass through the slot 24 in the spider and will engage the ring and move it against the action of the springs 18 into a position wherein it stands at a right angle to the tube. This releases the binding action of the ring on the tube so that it is free to be moved vertically in either direction to provide the desired height of seat. When this has been done the lever is swung back to its normal position which is substantially vertical, and the cam is withdrawn from its engagement with the ring which under the action of its associated springs is immediately drawn into binding engagement on the tube and connects the tube to the standard.

It is apparent that my improved construction has many advantages. The binding action of the ring on the tube may be adjusted to the best operating conditions by threading the bolts 17 either further into or out of the ring. The parts are simple and few in number and therefore may be readily assembled and adjusted.

While in describing my invention, I have referred to certain details of construction and arrangement of parts, this is to be taken as by way of illustration only and not by way of limitation, hence, I do not wish to be limited thereto except as may be pointed out in the appended claims.

I claim as my invention:

1. A chair embodying therein a standard comprising a plurality of legs, top and bottom spiders to which said legs are secured, a seat post, a tube in which said seat post is rotatively mounted and which tube passes through said spiders, a binding ring on said bottom spider, means carried by said spider for normally urging it into binding action upon said tube, and means also carried by said spider and adapted to be actuated to engage said ring to release its binding action on the tube.

2. A chair embodying therein a standard comprising a plurality of legs, top and bottom spiders to which said legs are secured, a seat post, a tube in which said seat post is rotatively mounted and which tube passes through said spiders, a ring surrounding said tube near said bottom spider, coacting means on said spider and ring providing a fulcrum for said ring, coacting means operatively connecting said ring and spider at a point spaced from the fulcrum for rocking said ring in one direction about said fulcrum into binding engagement with said tube, and means adapted to engage said ring and rock it in the other direction to release the binding action thereof from the tube.

3. A chair embodying therein a standard comprising a plurality of legs, top and bottom spiders to which said legs are secured, a seat post, a tube in which said seat post is rotatively mounted and which tube passes through said spiders, a ring surrounding said tube near said bottom spider, coacting means on said spider and ring providing a fulcrum for said ring, bolts passing through said bottom spider and threaded into said ring, springs on said bolts normally acting to rock the ring about said fulcrum in one direction into binding action on said tube, and means capable of being actuated in opposition to said springs for rocking said ring about the fulcrum in the opposite direction to release the binding action thereof from the tube.

In testimony whereof, I have hereunto set my hand this 1 day of March, 1930.

ARTHUR J. ADAMS.